United States Patent [19]

Tanahashi et al.

[11] Patent Number: 4,922,482
[45] Date of Patent: May 1, 1990

[54] APPARATUS AND METHOD FOR CREATING A DATA BUS ACCESS CONTEST

[75] Inventors: Keitaro Tanahashi, Shizuoka; Yuzuru Murata, Yokosuka, both of Japan

[73] Assignee: Ando Electric Co., Ltd., Tokyo, Japan

[21] Appl. No.: 226,096

[22] Filed: Jul. 29, 1988

[30] Foreign Application Priority Data

Jul. 29, 1987 [JP] Japan .................................. 62-189755

[51] Int. Cl.$^5$ ............................................. H04L 11/12
[52] U.S. Cl. ....................................... 370/13; 370/85.2
[58] Field of Search .................... 270/13, 17, 68.1, 85, 270/110.1, 85.1, 85.2, 85.3; 391/22

[56] References Cited

U.S. PATENT DOCUMENTS

| | | | |
|---|---|---|---|
| 4,383,312 | 5/1983 | Reed | 370/13 |
| 4,575,847 | 3/1986 | Fallwell, Jr. et al. | 371/22 |
| 4,722,082 | 1/1988 | Furuya et al. | 370/85 |

Primary Examiner—Douglas W. Olms
Assistant Examiner—Melvin Marcelo
Attorney, Agent, or Firm—Finnegan, Henderson, Farabow, Garrett & Dunner

[57] ABSTRACT

An apparatus and method are provided for testing the ability of a digital data communications network to resolve contests for data bus control. The network includes a plurality of terminal equipment units ("TEs") coupled to a digital service unit ("DSU") by a data bus. The apparatus comprises a testing device coupled to the data bus and adapted to transmit digital control data through the data bus to the DSU for a selected time to cause the testing device to obtain control of the data bus and to cause the TEs to assume a call demand state. The testing device is further adapted to terminate transmission of the digital control data from the testing device to cause the TEs to simultaneously transmit digital control data and cause a contest among the TEs for control of the data bus. The method comprises using a testing device to transmit digital control data through the data bus to the DSU for a selected time to cause the testing device to obtain control of the data bus and to cause the TEs to assume a call demand state, and terminating transmission of the digital control data from the testing device to cause the TEs to simultaneously transmit digital control data and cause a contest among the TEs for control of the data bus.

3 Claims, 2 Drawing Sheets

APPARATUS AND METHOD FOR CREATING A DATA BUS ACCESS CONTEST

BACKGROUND OF THE INVENTION

1. Field of the Invention

The present invention relates to digital data communication networks and, more specifically, to an apparatus and method for testing the ability of such a network to appropriately enter and resolve contests among elements on the network for control of the data bus.

2. Description of the Related Art

A digital data communication network such as an Integrated Service Digital Network ("ISDN") is shown in FIG. 2. The ISDN includes a plurality of terminal equipment units ("TEs") 1 and a Digital Service Unit ("DSU") 2. According to the International Telegraph and Telephone Consultative Committee standard I.430 ("CCITT-I.430"), an ISDN can accomodate a maximum of 8 TEs. Each of the TEs 1 is coupled to a DSU 2 by a data bus comprising a transmit line ("T line") and a return line ("R line") by which TEs 1 communicate with DSU 2. Each TE selectively transmits digital data to DSU 2 through the T line, and receives digital data from DSU 2 through the R line.

Digital data is communicated by each of the TEs 1 in the form of frames. Frame structures according to CCITT-I.430 are illustrated diagrammatically in FIG. 3/I.430 of the CCITT standard. An example of such frame structures is shown in FIG. 3, which illustrates a frame A and a frame B. Frame A communicates data from a given TE 1 to DSU 2, and includes a plurality of D-channels. Each D-channel comprises control data or a control bit, for example, the data "0" or "1", to indicate that the given TE desires or does not desire control of the data bus. The control data "0" generally indicates that control is desired whereas the control data "1" indicates control is not desired. Frame B communicates data from DSU 2 to TEs 1, and includes a plurality of E-channels corresponding to the D-channels. When a TE 1 transmits data in the D-channels of frame A to DSU 2 through the T line, DSU 2 returns this same data to corresponding ones of the E-channels of frame B and communicates the E-channels through the R line. Each TE continuously monitors the data in the E-channels of frame B.

When a TE does not require control of the data bus, it transmits the data "1" as the control data in the D-channels of frame A through the T line. DSU 2 returns the data "1" from the D-channels along the corresponding E-channels and transmits the E-channels in frame B through the R line.

When a TE requires control of the data bus, it transmits the data "038 as the control data in the D-channels of frame A. DSU 2 returns the data "0" from the D-channels through the corresponding E-channels in frame B through the R line. The TEs receive this E-channel data and compare it with the D-channel data transmitted. Upon determining that the control data of the D-channel and E-channel match, and upon determining from frame B that only that TE 1 transmitted a control data "0," that TE obtains control of the data bus and can begin or continue transmitting data on the data bus.

If more than one TE 1 transmits a control data "0" indicating an intention to begin transmitting simultaneously, there is contention for control of the data bus. Each of the TEs contending for control then operates in accordance with a set of priority rules such as those set forth in CCITT-I.430 to avoid and resolve this contention. Resolution is obtained by selecting one of the TEs to which control of the bus is given while the other TEs contending for control of the bus are put in a wait condition or state. While in the wait state, the other TEs 1 can not use the D-channels of frame A. Application of the priority rules also prevents malfunction of the contention and resolution processes.

When testing the ability of the TEs coupled to DSU 2 to identify a bus control contest and to resolve the contest in accordance with priority rules such as CCITT-I.430, it is generally necessary for each of TEs 1 to transmit the control data, e.g., the data "0", simultaneously. There has been a need for apparatus and methods to cause this simultaneous transmission of data from the TEs.

SUMMARY OF THE INVENTION

Accordingly, it is an object of the invention to provide an apparatus and method for testing bus control contest resolution that involve causing the TEs of a network to simultaneously transmit control data onto the data bus.

Additional objects and advantages of the invention will be set forth in the description that follows, and in part will be apparent from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, an apparatus and method are provided for testing the ability of a digital data communications network to resolve contests for data bus control. The network includes a plurality of TEs coupled to a DSU by a data bus, as described above. The apparatus comprises a testing device coupled to the data bus and adapted to transmit digital control data through the data bus to the DSU for a selected time to cause the testing device to obtain control of the data bus and to cause the TEs to assume a call demand state. The testing device is further adapted to terminate transmission of the digital control data from the testing device to cause the TEs to simultaneously transmit digital control data and cause a contest among the TEs for control of the data bus. The method comprises using a testing device to transmit digital control data through the data bus to the DSU for a selected time to cause the testing device to obtain control of the data bus and to cause the TEs to assume a call demand state, and terminating transmission of the digital control data from the testing device to cause the TEs to simultaneously transmit digital control data and cause a contest among the TEs for control of the data bus.

BRIEF DESCRIPTION OF THE DRAWINGS

The accompanying drawings, which are incorporated in and constitute a part of the specification, illustrate a presently preferred embodiment and method of the invention and, together with the general description given above and the detailed description of the preferred embodiment and method given below, serve to explain the principles of the invention. Of the drawings.

DESCRIPTION OF THE PREFERRED EMBODIMENT AND METHOD

Figure 1:
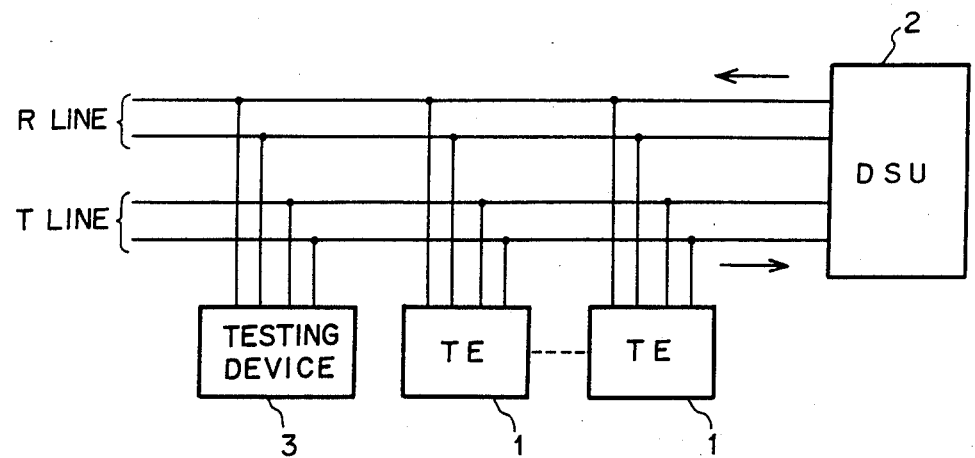
FIG. 1 is a schematic diagram of a digital communication network such as an ISDN having a testing device in accordance with the preferred embodiment of the invention.

Reference will now be made in detail to the presently preferred embodiment and method of the invention as illustrated in the accompanying drawings, in which like reference characters designate like or corresponding parts throughout the several drawings.

Figure 2:
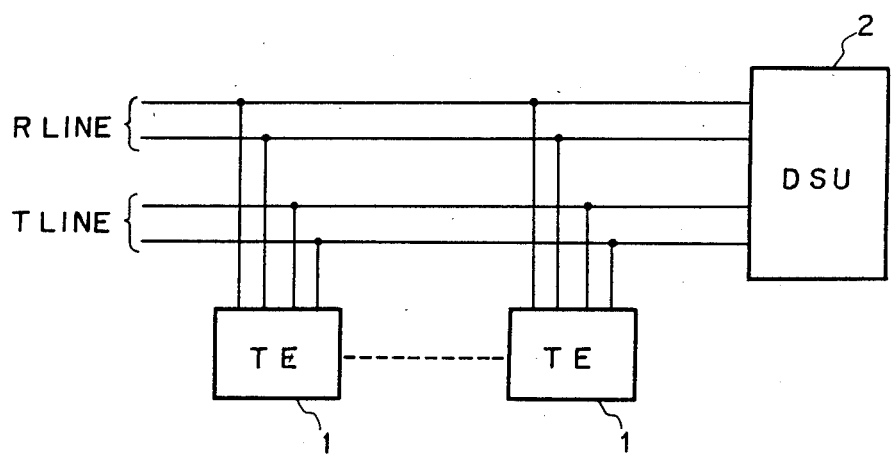
FIG. 2 is a schematic diagram of a conventional digital communication network such as an ISDN.

A schematic diagram of a digital communication network such as an ISDN in accordance with the preferred embodiment of the invention is shown in FIG. 1. The ISDN of FIG. 1 includes TEs 1, a DSU 2, a T line, and an R line which are configured and operate the same as the ISDN of FIG. 2. The ISDN of FIG. 1, however, further includes a testing device 3 coupled to the T line and the R line and, thereby, coupled to TEs 1 and DSU 2. Testing device 3 is configured as and generally operates as one of the TEs, but its operation is modified as described below.

Figure 4:
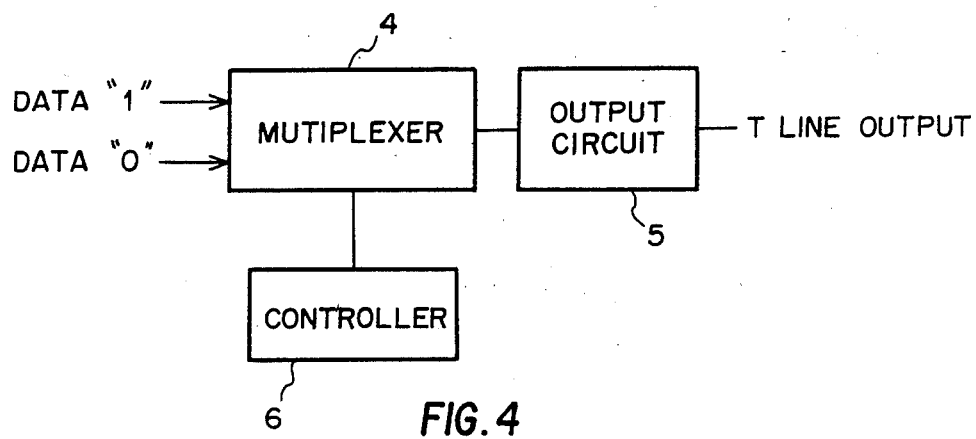
FIG. 4 is a block diagram of the testing device of FIG. 1 in accordance with the preferred embodiment.

Testing device 3, a block diagram of which is shown in FIG. 4, includes a multiplexer 4 coupled to an output circuit 5 and a controller 6. Controller 6 selects digital data in the form of a "0" or "1" and transmits the selected data to output circuit 5 via multiplexer 4. Output circuit 5 constructs a signal corresponding to frame A in accordance with CCITT-I.430, and in which the selected data received from controller 6 is incorporated into the D-channel. Thus, the data in the D-channel is made to correspond to the digital data received from controller 6. Frame A is then transmitted through the T line of the data bus. This enables testing device 3 to selectively obtain control of the data bus in response to the digital data selected by controller 6.

Figure 3:
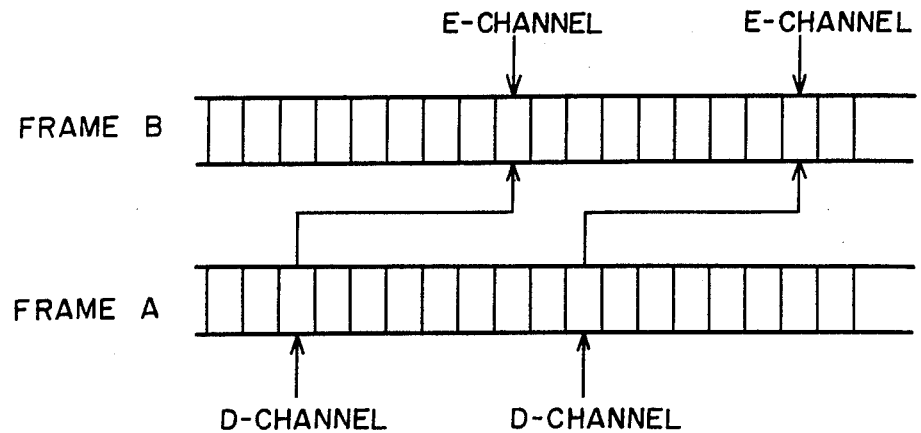
FIG. 3 illustrates the frame structures of digital data frames communicated between TEs 1 and DSU 2 shown in FIGS. 1 and 2.

Testing of the ability of TEs to contend for control of the data bus and resolve this contention in accordance with priority rules such as those of CCITT-I.430 is carried out with the ISDN of FIG. 1 in the following manner. A digital "0" is selected by controller 6 as digital input data and communicated to output circuit 5 via multiplexer 4. Output circuit 5 responds by constructing a frame corresponding to frame A of FIG. 3 in which the D-channel includes the control data "0". Frame A is then communicated from testing device 3 to DSU 2 through the T line. DSU 2 returns this control data through the E-channel and communicates it through the R line. The control data in the E-channel is received by TEs 1, which recognize the control of the bus exercized by testing device 3 and assume a wait state. Control of the data bus is maintained in this manner by testing device 3 for a selected time, during which the TEs develop the need for control of the data bus and assume a call demand state of waiting to request bus control while in the wait state.

After the selected time, a digital "1" is selected by controller 6 as digital input data, and is communicated to output circuit 5 via multiplexer 4. This causes output circuit 5 to stop transmitting the data "0" in the D-channels. In response, the TEs 1 simultaneously exit the wait state and begin to transmit. Simultaneous transmission by the TEs 1 creates contention among the TEs for control of the data bus.

Thus, testing device 3 acquires control of the data bus and then induces contention among the TEs coupled to the bus. The resolution or outcome of the contention can be determined by identifying the one of the TEs 1 obtaining control of the data bus immediately after the contention is resolved. This resolution can be compared with the resolution that would be obtained in accordance with CCITT-I.430. If the contention resolution actually obtained matches the resolution according to CCITT-I.430, the test has verified that contention resolution is in accordance with CCITT-I.430.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method for creating a contest among a plurality of terminal equipment units coupled to a digital service unit by a data bus in an Integrated Service Digital Network-compatible network for access to the data bus, the terminal equipment units intermittently transmitting a digital control data in a D channel to request access to the data bus, said method comprising:

using a testing device to transmit the digital control data in the D channel through the data bus to the digital service unit for a first selected time to cause the testing device to gain access to the data bus, the first selected time being of a sufficient duration that the terminal equipment units assume a call demand state; and terminating transmission of the digital control data from the testing device for a second selected time of duration sufficient that the terminal equipment units simultaneously transmit the digital control data and enter into a contest among the terminal equipment units for access to the data bus.

2. An apparatus for creating a contest among a plurality of terminal equipment units coupled to a digital service unit by a data bus in an Integrated Service Digital Network-compatible network for access to the data bus, the terminal equipment units intermittently transmitting a digital control data in a D channel to request access to the data bus, said apparatus comprising a testing device coupled to the data bus for transmitting the digital control data in the D channel through the data bus to the digital service unit for a first selected time to cause the testing device to gain access to the data bus, the first selected time being of a sufficient duration that the terminal equipment units assume a call demand state, said testing device terminating transmission of the digital control data from the testing device for a second selected time of sufficient duration that the terminal equipment units simultaneously transmit the digital control data and cause a contest among the terminal equipment units for access to the data bus.

3. An apparatus according to claim 2, wherein the testing device includes:

control means for selecting digital input data; and output circuit means coupled to the control means and responsive to the digital input data for constructing a frame of the digital control data associated with the D channel indicating that control of the data bus is to be given to the testing device, and for transmitting the frame of digital control data to the digital service unit and to the terminal equipment units through the data bus.

* * * * *